US009118412B2

(12) United States Patent
Dvir et al.

(10) Patent No.: US 9,118,412 B2
(45) Date of Patent: Aug. 25, 2015

(54) SYSTEM AND METHOD FOR PERFORMING IN-BAND REFLECTION ANALYSIS IN A PASSIVE OPTICAL NETWORK

(75) Inventors: Amiad Dvir, Nes-Ziona (IL); Assaf Naor, Tel Aviv (IL)

(73) Assignee: Broadcom Corporation, Irvine, CA (US)

( * ) Notice: Subject to any disclaimer, the term of this patent is extended or adjusted under 35 U.S.C. 154(b) by 744 days.

(21) Appl. No.: 13/246,161

(22) Filed: Sep. 27, 2011

(65) Prior Publication Data

US 2013/0077975 A1 Mar. 28, 2013

(51) Int. Cl.
H04B 10/08 (2006.01)
H04B 10/20 (2006.01)
H04B 10/071 (2013.01)
G01M 11/00 (2006.01)

(52) U.S. Cl.
CPC ......... *H04B 10/071* (2013.01); *G01M 11/3118* (2013.01); *G01M 11/3127* (2013.01); *G01M 11/3136* (2013.01); *G01M 11/3145* (2013.01)

(58) Field of Classification Search
None
See application file for complete search history.

(56) References Cited

U.S. PATENT DOCUMENTS

| 4,911,515 | A  | * | 3/1990  | So et al. .......................... 398/28 |
| 6,980,287 | B2 |   | 12/2005 | Renard et al. |
| 7,167,237 | B2 |   | 1/2007  | Shimizu et al. |
| 7,428,382 | B2 |   | 9/2008  | Soto et al. |
| 7,715,718 | B2 |   | 5/2010  | Smith et al. |
| 7,821,455 | B2 | * | 10/2010 | Chen et al. .............. 342/357.71 |
| 8,509,613 | B2 | * | 8/2013  | Chung et al. ..................... 398/17 |
| 8,526,824 | B1 | * | 9/2013  | Turner et al. .................. 398/158 |
| 8,655,166 | B2 | * | 2/2014  | Soto et al. ....................... 398/13 |
| 2008/0077343 | A1 | * | 3/2008  | Johansson ...................... 702/71 |
| 2009/0103922 | A1 | * | 4/2009  | Lee et al. ......................... 398/72 |
| 2009/0257743 | A1 |   | 10/2009 | Chung et al. |
| 2009/0268197 | A1 |   | 10/2009 | Perron et al. |
| 2011/0013904 | A1 | * | 1/2011  | Khermosh et al. .............. 398/16 |
| 2011/0102776 | A1 |   | 5/2011  | Hasegawa et al. |

(Continued)

FOREIGN PATENT DOCUMENTS

| KR | 2011/0090045 | 8/2011 |
| WO | WO 91/02959  | 3/1991 |
| WO | WO 92/11710  | 7/1992 |

(Continued)

OTHER PUBLICATIONS

Sackinger, Eduard, Broadband Circuits for Optical Fiber Communication, 2005, Wiley-Interscience, pp. 6-8.*

(Continued)

*Primary Examiner* — Ken Vanderpuye
*Assistant Examiner* — Jai Lee
(74) *Attorney, Agent, or Firm* — Sterne, Kessler, Goldstein & Fox PLLC

(57) ABSTRACT

A system for performing in-band reflection analysis in a passive optical network. The system comprises an optical line terminal (OLT) that includes a transceiver for transmitting continuous downstream data modulated on a first wavelength and receiving upstream burst data modulated on a second wavelength, the OLT further includes a receiver for receiving signals reflected from the PON that are modulated on the first wavelength, wherein the continuous downstream data comprises user data and a test data pattern; and a reflection analysis unit for cross-correlating between a time-shifted version of the transmitted test data pattern and the reflected signals, wherein the test data pattern is time-shifted relatively for an optical location to be tested.

24 Claims, 6 Drawing Sheets

(56) References Cited

U.S. PATENT DOCUMENTS

2011/0116799 A1 5/2011 Effenberger
2013/0077961 A1 3/2013 Dvir et al.

FOREIGN PATENT DOCUMENTS

WO WO 95/17053 6/1995

OTHER PUBLICATIONS

Aizawa et al., Advances in Multimedia Information Processing, 2004, Springer-Verlag Berlin Heidelberg, pp. 357-358.*
Takushima et al., In-Service OTDR for Passive Optical Networks, 2010, Optical Society of America.*
Takushima et al., In-Service OTDR for Passive Optical Networks, 2010, Optical Society of America, pp. 1-3.*
International Search Report and Written Opinion for International Application No. PCT/IB2012/002450, European Patent Office, mailed Mar. 1, 2013.
International Search Report and Written Opinion for International Application No. PCT/IB2012/002450, European Patent Office, mailed Apr. 10, 2014.

* cited by examiner

| | Downstream data 610 | LPF 431 output 620 | Down-sampled data 630 | Skip indicator 640 |
|---|---|---|---|---|
| | 0 | | | |
| | 0 | | | |
| | 0 | | | |
| | 0 | | | |
| | 0 | | | |
| | 0 | | | |
| | 1 | | | |
| | 0 | | | |
| | 0 | | | |
| 601 | 0 | 0.1 | 0.1 | 1 |
| | 0 | 0.1 | | |
| | 0 | 0.1 | | |
| | 1 | 0.2 | | |
| | 1 | 0.3 | | |
| | 0 | 0.3 | | |
| | 0 | 0.3 | | |
| | 0 | 0.2 | | |
| | 0 | 0.2 | | |
| | 1 | 0.3 | | |
| 602 | 0 | 0.3 | 0.3 | 1 |
| | 1 | 0.4 | | |
| | 0 | 0.4 | | |
| | 0 | 0.3 | | |
| | 0 | 0.2 | | |
| | 1 | 0.3 | | |
| | 1 | 0.4 | | |
| | 1 | 0.5 | | |
| | 1 | 0.6 | | |
| | 0 | 0.5 | | |
| 603 | 0 | 0.5 | 0.5 | 0 |
| | 1 | 0.5 | | |
| | 0 | 0.5 | | |
| | 0 | 0.5 | | |
| | 0 | 0.5 | | |
| | 1 | 0.5 | | |
| | 0 | 0.4 | | |
| | 1 | 0.4 | | |
| | 1 | 0.4 | | |
| | 0 | 0.4 | | |
| | 0 | 0.4 | 0.4 | 0 |
| | 1 | 0.4 | | |
| | 1 | 0.5 | | |
| | 1 | 0.6 | | |
| | 0 | 0.6 | | |
| | 1 | 0.6 | | |
| | 0 | 0.6 | | |
| | 1 | 0.6 | | |
| | 0 | 0.5 | | |
| | 0 | 0.5 | | |
| 604 | 1 | 0.6 | 0.6 | 0 |
| | 1 | 0.6 | | |
| | 1 | 0.6 | | |
| | 1 | 0.6 | | |
| | 1 | 0.7 | | |
| | 0 | 0.6 | | |
| | 1 | 0.7 | | |
| | 0 | 0.6 | | |
| | 0 | 0.6 | | |
| | 0 | 0.6 | | |
| 605 | 0 | 0.5 | 0.5 | 0 |

FIG. 6

SYSTEM AND METHOD FOR PERFORMING IN-BAND REFLECTION ANALYSIS IN A PASSIVE OPTICAL NETWORK

TECHNICAL FIELD

The present invention relates generally to passive optical networks (PONs), and more particularly for performing in band reflection analysis in such systems.

BACKGROUND OF THE INVENTION

A passive optical network (PON) comprises an optical line terminal (OLT) connected to multiple optical network units (ONUs) in a point-to-multi-point network. New standards have been developed to define different types of PONs, each of which serves a different purpose. For example, the various PON types known in the related art include an Ethernet PON (EPON), a Gigabit PON (GPON), a 10-Gigabit (XGPON), and others.

An exemplary diagram of a typical PON 100 is schematically shown in FIG. 1. The PON 100 includes N ONUs 120-1 through 120-N (collectively known as ONUs 120) coupled to an OLT 130 via a passive optical splitter 140. In a GPON, for example, traffic data transmission is achieved using GPON encapsulation method (GEM) over two optical wavelengths, one for the downstream direction and another for the upstream direction. Downstream transmission from the OLT 130 is broadcast to all the ONUs 120. Each ONU 120 filters its respective data according to pre-assigned labels (e.g., GEM port-IDs in a GPON). The splitter 140 is a 1 to N splitter, i.e., capable of distributing traffic between a single OLT 130 and N ONUs 120. In most PON architectures, the upstream transmission is shared between the ONUs 120 in a TDMA based access, controlled by the OLT 130.

In order to provide reliable operation of the PON, there is a need to identify faults that occur on the optical fibers and/or optical components of the PON, for example, detection of breaks or of major attenuation, due to a bent fiber, dirty connectors, and so on. Additionally, in order to allow repairing of a faulty optical fiber, there is a need to locate the exact location of a fault for a faster, more efficient network repair.

Optical faults and their location in the PON can be detected using optical time-domain reflectometers (OTDRs). The principle of an OTDR includes injecting, at one end of the fiber, a series of optical pulses into the fiber under test and also extracting from the same end of the fiber, light that is scattered (Rayleigh backscatter) or reflected back from points along the fiber. The strength of the return pulses is measured and integrated as a function of time and may be plotted as a function of fiber length. The results may be analyzed to estimate the fiber's length, the overall attenuation, to locate faults, such as breaks, and to measure optical return loss.

OTDR measurement techniques of the PON include "out of band", "in band", and different wavelengths. Out-of-band testing requires stopping the normal operation of the network and verifying the fiber using external OTDR tools. This can be performed using, for example, wavelengths and test pulses that are separate and independent from all other wavelengths used to carry customer service traffic.

The in-band OTDR testing may be performed when the network is operational. However, such a testing requires dedicated OTDR testing signals. The OTDR testing signals utilized in conventional in-band OTDR solutions are either AM modulated or FM modulated. As such they can be transmitted during a test period of the PON, during which time data signals are not transmitted to the ONUs. Other OTDR solutions utilize a dedicated upstream wavelength for measuring reflection from the fiber. However, such solutions require an additional transceiver.

It would be therefore advantageous to provide a solution for performing reflection analysis in a PON while overcoming the deficiencies of prior art testing techniques.

SUMMARY OF THE INVENTION

Certain embodiments include herein include a system for performing in-band reflection analysis in a passive optical network (PON). The system comprises an optical line terminal (OLT) that includes a transceiver for transmitting continuous downstream data modulated on a first wavelength and receiving upstream burst data modulated on a second wavelength, the OLT further includes a receiver for receiving signals reflected from the PON that are modulated on the first wavelength, wherein the continuous downstream data comprises user data and a test data pattern; and a reflection analysis unit for cross-correlating between a time-shifted version of the transmitted test data pattern and the reflected signals, wherein the test data pattern is time-shifted relatively for an optical location to be tested.

Certain embodiments include herein also include a method for performing in-band reflection analysis in a passive optical network (PON). The method comprises establishing a dedicated receive path at an optical line terminal (OLT) of the PON to receive signals reflected from the PON, wherein the reflected signals are modulated on a downstream wavelength of the OLT; transmitting continuous downstream data modulated on the downstream wavelength, wherein the downstream data includes user data and a test data pattern; and cross-correlating between a time-shifted version of the transmitted test data pattern and the reflected signals, wherein the test data pattern is time-shifted relative to an optical location to be tested.

Certain embodiments include herein also include an optical line terminal (OLT) operative in a passive optical network (PON) and configured to perform in-band reflection analysis. The OLT comprises a transceiver for transmitting continuous downstream data modulated on a first wavelength and receiving burst upstream data modulated on a second wavelength; a receiver for receiving signals reflected from the PON and being modulated on the first wavelength; a MAC module for generating the continuous downstream data, wherein the continuous downstream data includes user data and a test data pattern; and a reflection analysis unit for cross-correlating between a time-shifted version of the transmitted test data pattern and the reflected signals, wherein the test data pattern is time-shifted relatively for an optical location to be tested.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

FIG. 6 is an example demonstrating the reflection analysis.

DETAILED DESCRIPTION OF THE INVENTION

Figure 1:
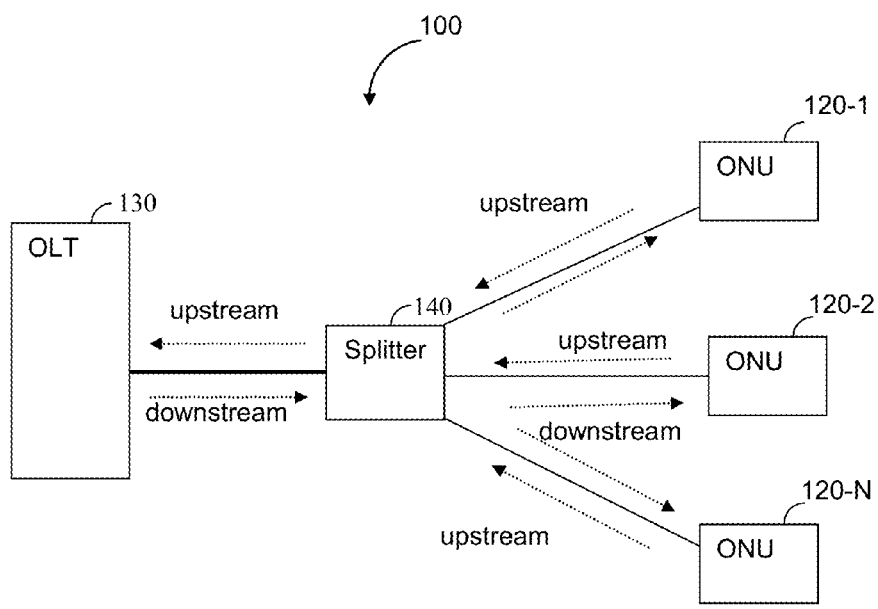
FIG. 1 is a schematic diagram of a PON.

It is important to note that the embodiments disclosed are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to certain exemplary embodiments of the invention an in-band OTDR of PONs is performed using a reflection analysis method. Accordingly, continuous downstream data including a test data pattern is transmitted by an OLT to ONUs of the PON. The test data pattern is time-shift cross-corrected with a signal received through a dedicated receiver in the OLT, and a reflection analysis is performed on the cross-corrected results. The results of the reflection analysis can be processed to at least detect faults in their locations in the optical path of the PON. The downstream data including the test data pattern is fully compliant with the communication specifications employed by the respective PON. Thus, it should be appreciated that the reflection analysis can be performed during normal operation of the PON and it is not limited to a testing period any time a downstream data signal can be transmitted through the PON for analysis.

In an embodiment of the invention, the test data pattern is a continuous high rate data pattern that is characterized by low frequency components. The high rate is the transmission rate of the PON (e.g., 2.5 Gbit/sec for GPON or 9.9 Gbit/sec in XG-PON). The low frequency components are generated using a low rate polynomial and may be at a rate of, for example, 58.32 Mbit/sec to 155.52 Mbit/sec. Various techniques for generating the test data pattern and encapsulating the pattern in downstream data frames can be found in a co-pending patent application entitled "TECHNIQUES FOR GENERATING LOW RATE DATA PATTERNS COMPLIANT WITH PASSIVE OPTICAL NETWORKS", assigned to the common assignee of the present application.

Figure 2:
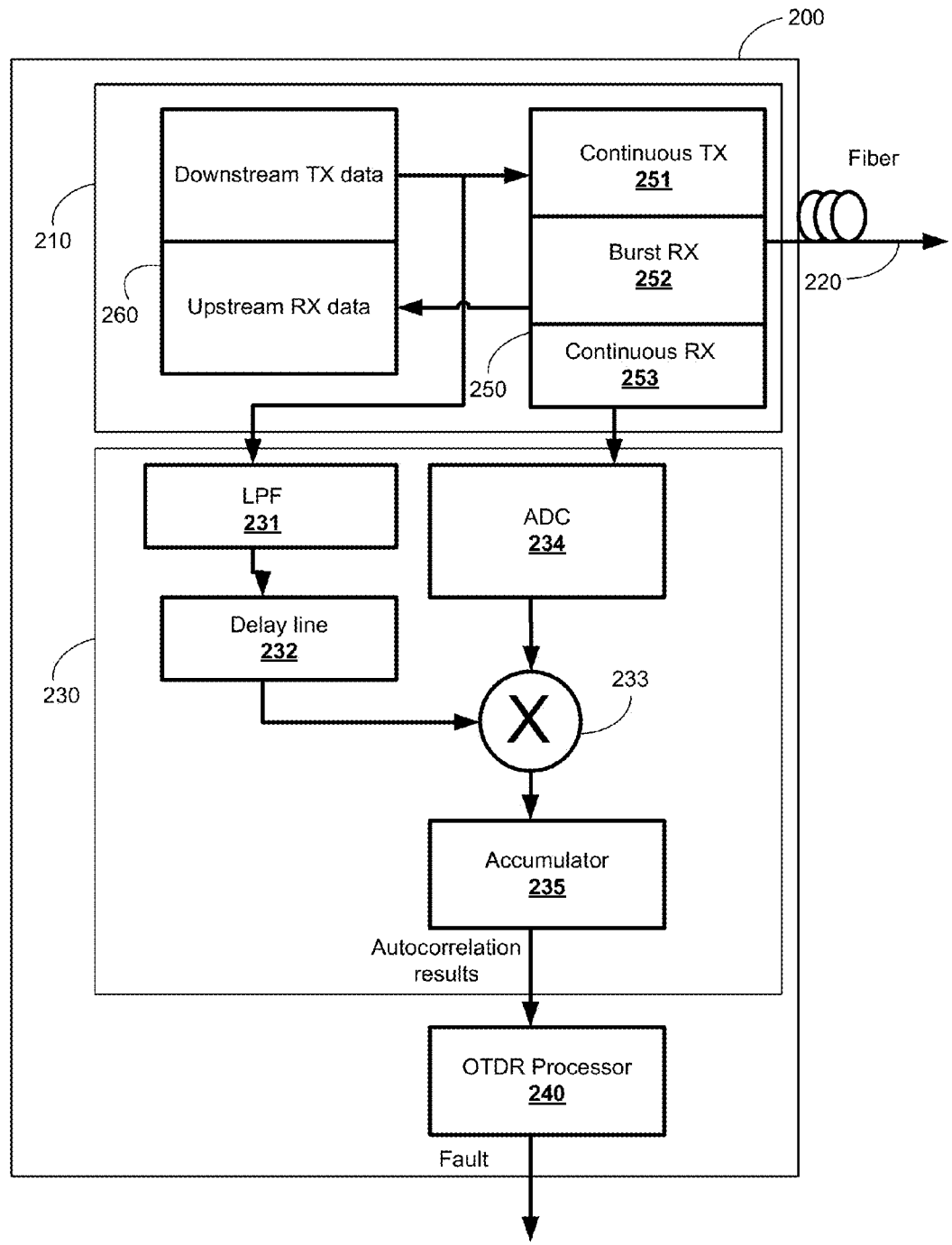
FIG. 2 is a block diagram of a system for performing reflection analysis according to an embodiment of the invention.

FIG. 2 shows an exemplary block diagram of a system 200 for in-band OTDR of a PON by performing reflection analysis according to an embodiment of the invention. The system 200 includes an OLT 210 that is connected to an optical fiber 220 of the PON, and a reflection analysis unit 230. The OLT 210 communicates with a plurality of ONUs (not shown in FIG. 2) through one or more splitters (not shown) and the fiber 220.

In an embodiment of the invention, the system 200 also includes an OTDR processor 240 adapted for detecting faults and their locations in the PON. Such faults include, for example, flattened fiber, bends, bad splices, dirty connectors, and a fiber cut.

The OLT 210 includes, among other components, an optical module 250 and a MAC module 260. The optical module 250 includes a continuous optical transmitter 251 adapted to transmit continuous optical signals at a wavelength λ1 and an optical burst receiver 252 that receives optical signals (sent from ONUs) at a wavelength λ2. The wavelengths λ1 and λ2 are defined by the respective standard of the PON for carrying downstream and upstream data respectively. For example, according to GPON standard, the OLT generates an optical signal of 1480 nm to 1500 nm (referred to as 15XY) at the downstream direction, and at the upstream direction each ONU transmits an optical signal of 1260 nm to 1330 nm (also referred to as 13XY).

In accordance with an embodiment of the invention, the optical module 250 also includes a continuous optical receiver 253 adapted to receive optical signals at the wavelength λ1, i.e., the wavelength of signals transmitted in the downstream direction by the transmitter 251. As there is no connection between the optical transmitter 251 and the continuous optical receiver 253, the latter receives optical signals reflected from the fiber 220. The reflected signals are analyzed by the reflection analysis unit 230 as will be described below. It should be noted that the reflected signal as received at the optical receiver 253 corresponds to the downstream data transmitted by the transmitter 251. Thus, the reflected signals include low frequency (rate) components similar to the test pattern injected to the downstream data. As will be further described below, the optical receiver 253 is also a bandwidth limiter, thus acts as a low pass filter. This ensures that high frequency components and reflected signals are filtered out, thus does not affect the reflection analysis.

The MAC module 260 generates continuous downstream data that is transmitted to the ONUs. The MAC module 260 operates according to the type of the PON. That is, the MAC module 260 may be compliant with the communication standard including, but not limited to, Ethernet PON (EPON), Gigabit (PON), XGPON, and the like. The MAC module 260 is also adapted to process burst upstream data sent from ONUs of the PON.

The reflection analysis unit 230 performs a continuous time-shift cross-correlation between the transmitted downstream data and data signals received through the continuous optical receiver 253. With this aim, the reflection analysis unit 230 includes a low pass filter (LPF) 231 coupled to a delay line 232 that can be set to a predefined delay value 'x', a multiplier 233, an analog to digital converter (ADC) 234 coupled to the output of the receiver 253, and an accumulator 235.

The LPF 231 filters out high frequency components from the transmitted continuous downstream data (output by the MAC module 260). This is performed in order to ensure that the cross-correlation will be performed between low frequency components of the transmitted data and the reflected signal to guarantee accurate results. The cutoff frequency of the LPF 231 is set to match the bandwidth of the receiver 253. In an embodiment of the invention, the output of the LPF 231 is down-sampled to meet the sampling rate of the ADC 234. The filtered data is delayed by the delay line 232. The time delay value 'x' is predetermined according to a location on the optical path to be tested. The delay value x can be determined using the following equation:

$$\text{Optical distance} = (x * C * \text{refraction-index})/2 \qquad [1]$$

where, C is the light speed.

The delay value 'x' is a configurable parameter and a reflection analysis can be computed for different values of x. The output of the delay line 232 is a time-shifted low-rate (frequency) data.

The output of the delay line 232 is scaled to prevent zero values. The scaling is by a user defined constant value and may be performed by any scaling technique discussed in the related field of the art of signal scaling. The ADC 234 converts the received continuous optical signals (output by receiver 253) to digital signals. In an embodiment of the invention, the ADC 234 is a 'k' bit ADC, where 'k' represents an integer number equal to or greater than 1. The output of the ADC 234 is multiplied with the output of the data delay line 232 by means of a multiplier 233.

Then, the multiplication result is accumulated by means of the accumulator 235. The accumulation is performed over N times, where N is a function of the length of the test data pattern in the downstream data or a length of low frequency components in the downstream data. It should be appreciated that the value of the parameter N defines the dynamic range of the test. In an embodiment of the invention, the value of N is predetermined based on a typical length of binary sequence characterized by low frequency components that typically exist in continuous data sent in the downstream direction.

The output of the accumulator 235 is the cross-correlation of the reflected signal (as received by the receiver 253) and a time-shifted (delayed) signal transmitted in the downstream direction. In an embodiment of the invention, the reflection analysis for a delay x (i.e., a certain location at the PON) is performed P times, where P is a configurable parameter. This allows averaging the computed cross-correlation results P times, thus increasing the accuracy of the analysis.

In an embodiment of the invention, the cross-correlation results, produced by the reflection analysis unit 230, can be processed by the OTDR processor 240 to detect optical faults in their locations in the PON. With this aim, the OTDR processor 240 compares the value of the cross-correlation at delay (location) x to a value that indicates normal or acceptable behavior at a location on the optical path, respective of the delay x. The OTDR processor 240 generates a fault indication for any deviation from the norm.

In an embodiment of the invention, the OTDR processor 240 can also generate a graph representative of the cross-correlation results for different values of delay 'x', each such value representing a different optical distance on the fiber 220. Any non cross-correlated results are noticeable on the graph (e.g., as blips) and are indicative of faults in the optical path.

Figure 3A:
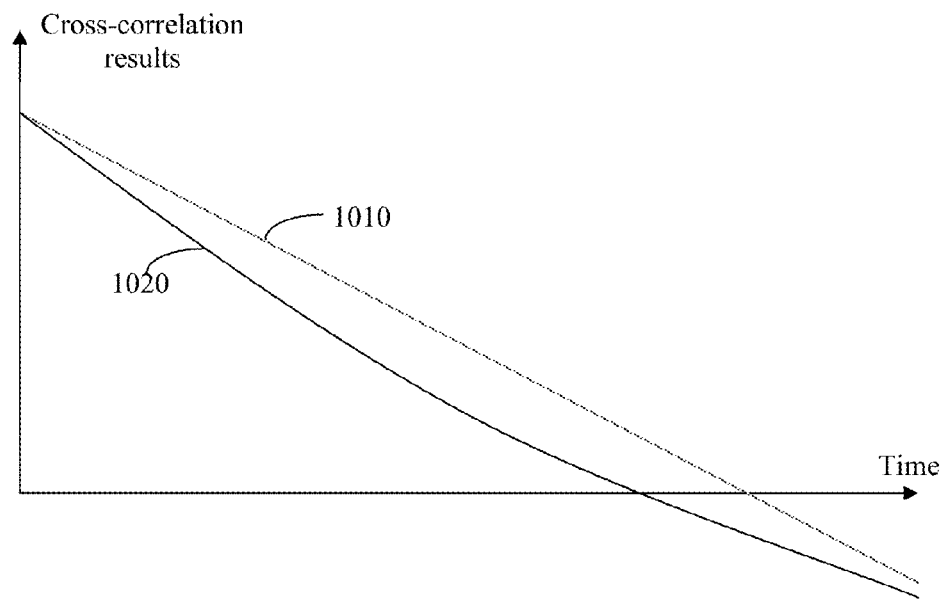
FIGS. 3A and 3B show graphs of the power of a returned signal over time as generated using an embodiment of the invention.
Figure 3B:
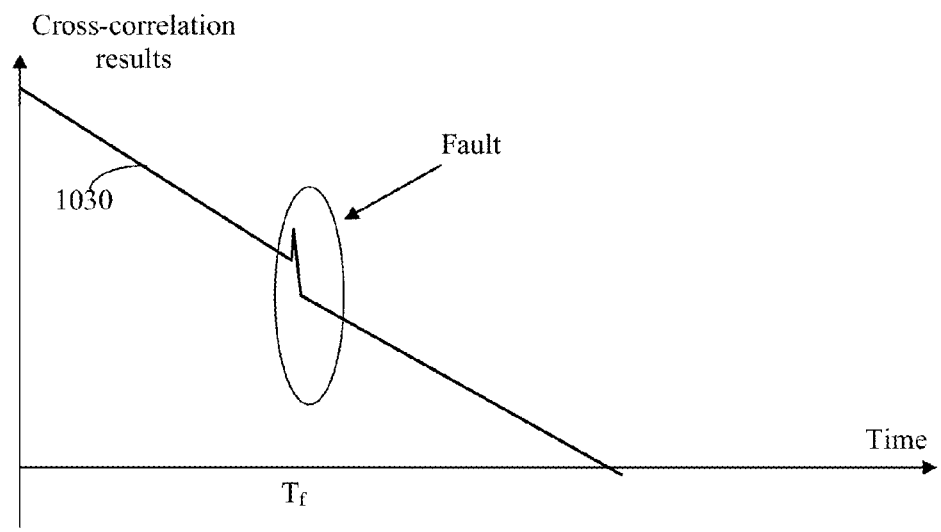

FIG. 3A shows graphs 1010 and 1020 that are examples for possible normal cross-correlations between the transmitted test data pattern and the signal received by the continuous receiver 253. FIG. 3B depicts a graph 1030 showing a blip at time T (relative to the time delay x). This indicates a fault in the optical path that may be a result of, for example, a bad connector that returns some of the power. The location of the fault is at (C*T)/2. Examples for other faults that can be detected include a cut fiber, a flattened fiber, bends in the fiber, dirty connectors, and so on.

Figure 4:
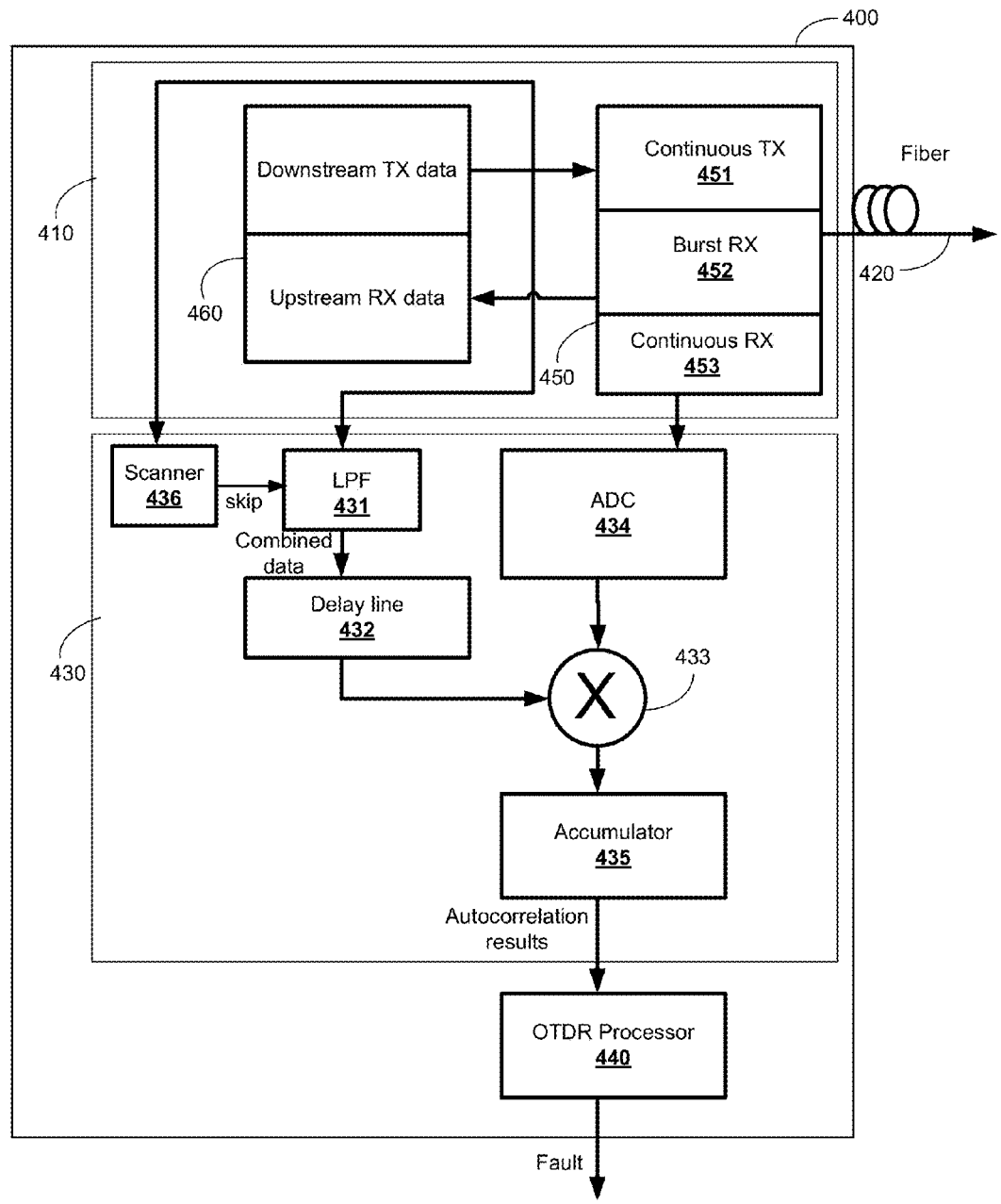
FIG. 4 is a block diagram of a system for performing reflection analysis according to another embodiment of the invention.

FIG. 4 shows an exemplary block diagram of a system 400 for in-band OTDR of PON by performing reflection analysis according to another embodiment of the invention. The system 400 includes an OLT 410 that is connected to an optical fiber 420 of the PON, a reflection analysis unit 430, and an OTDR processor 440. The OLT 410 includes an optical module 450 and a MAC module 460. The structure and functionality of the OLT 410, optical fiber 420, OTDR processor 440, optical module 450, and MAC module 460 are similar to the OLT 210, optical fiber 220, OTDR processor 240, optical module 250 and a MAC module 260 described in detail above. For the sake of brevity the description of these components will not be repeated herein.

The reflection analysis unit 430 includes a data scanner 436 coupled to the output of the MAC module 460 and a LPF 431. The data scanner 436 samples the downstream data output by the MAC module 460 and identifies data patterns that should not be cross-correlated by the reflection analysis unit 430. As mentioned above, the techniques described herein are operable during normal operation of the PON, thus user data can be transmitted together with the test data pattern as part of the continuous downstream data. That is, some frames may include user data while others may include the test patterns. The data scanner 436, in an embodiment of the invention, asserts a skip indication when the density of the high frequency components in the downstream data is above a pre-defined threshold.

In another embodiment, the skip decision may be based on the output of the LPF 431, an example of which is provided below. In this embodiment, the data scanner 436 is coupled to the output of the LPF 431. In yet another embodiment of the invention, the skip indication may be generated based on the value of a target ONU field's value in the transmitted downstream frames (e.g., GEM frame). If the field's value includes an identifier that is not associated with any ONU in the PON, then the skip indicator is asserted. It should be noted that the skip indication may be generated based on one or more, or a combination thereof, of the techniques discussed herein.

The skip indication is added to the filtered data output by the LPF 431. In an embodiment of the invention, the combined data is down-sampled to meet the sampling rate of the ADC 434. The combined data is delayed by a time delay value x by means of a delay line 432. The output of the delay line 432 is scaled to prevent zero values. In an embodiment of the invention, such scaling is performed by the delay line 432. As mentioned above, the scaling of the delayed signal is by a user defined constant value and may be performed by any scaling technique discussed in the related field of the art of signal scaling. The delayed and scaled signal is further multiplied, by means of a multiplier 433, with a digital data respective of an optical signal received by the receiver 453. The result of the multiplication is accumulated by means of the accumulator 435. The accumulation is performed only for multiplication results that do not include a skip indication. Thus, data indicated as skip is not included in the output of the reflection analysis, hence is not part of the cross-correlation. The total number of accumulations cannot exceed N times, where N is the length of a pattern as defined above. It should be appreciated that by ignoring data that includes high frequency components, the reflection analysis unit 430 does not cross-correlate such signals. This ensures accurate results of the refection analysis.

In an embodiment of the invention, the outcome of the accumulator 435 is processed by the OTDR processor 440 to detect faults and their locations in the optical path of the PON. The operation of the OTDR processor 440 is described above with a reference to FIGS. 3A and 3B.

Figure 5:
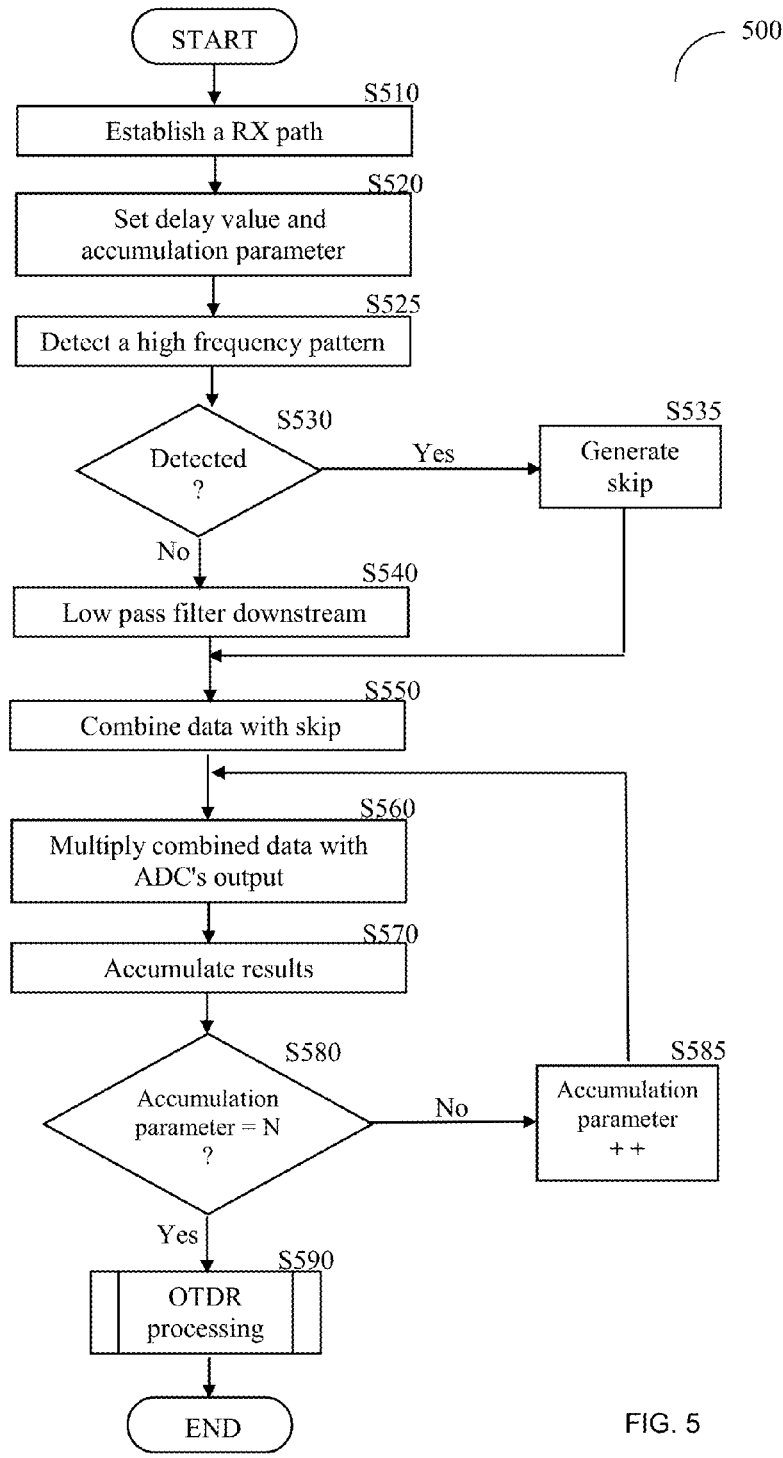
FIG. 5 is a flowchart describing a process for detecting faults in an optical path of a PON in accordance with an embodiment of the invention.

FIG. 5 is a non-limiting and exemplary flowchart 500 illustrating the method for detecting faults and their exact locations in an optical path in a PON according to an embodiment of the invention. At S510, a dedicated receive path is established at the OLT to receive continuous optical signals at wavelengths of the OLT's continuous transmitter. Thus, through the receive path optical signals reflected from the optical fiber are received. The reflected signals correspond to the downstream data transmitted by the OLT.

At S520, a delay x is set to a value receptive of an optical location requested to be tested (see for example equation [1] above). In addition, an accumulation parameter is set to zero. At S525, downstream data generated by the OLT is scanned to detect a pattern that should not be cross-correlated. For example, a pattern that is characterized by a high density of the high frequency components should not be cross-correlated. At S530, it is checked if such a pattern was detected; and if so, at S535, a skip indication is generated; otherwise, execution continues with S540 where the downstream data is low-pass filtered to remove high frequency components. At S550, the filtered data is combined with the skip indication, if such indication was generated. Optionally, the data is down sampled to meet the sampling rate of the ADC. At S560, the combined data is multiplied with the output of the ADC which is a value respective of the reflected optical signal (received through the receive path). It should be noted that the value generated by the ADC can be a rational number or a binary number. At S570, the multiplication result of the combined data is accumulated with a previous multiplication result according to the skip indication. That is, if the skip indication indicates that the current value should be skipped, the respective multiplication result is not accumulated. At S580, it is checked if the number of the accumulation parameter is equal to N, where N is the length of the test data pattern for which the reflection analysis is performed. If so, execution continues with S590; otherwise, the accumulation parameter is increased by one (S585) and execution returns to S560.

At S590, the cross-correlated value for the delay x (output at S580) is compared to a normal cross-correlation (or reflected power) value for a location in the optical path respective of the delay x. Any deviation from the normal is an indication for a fault in the optical path. For example, a higher cross-correlation value may be indicative of a flattened fiber, while a value lower than the norm is indicative of attenuations in the fiber.

In an embodiment of the invention, the reflection analysis illustrated in FIG. 6 for a specific delay x is performed P times (P is an integer number greater than 1), where P is a configurable parameter. This allows averaging the cross-correlation results computed P times, thus increasing the accuracy of the analysis.

FIG. 6 shows a non-limiting example for the operation of the of reflection analysis unit 430. A portion of the downstream data is shown in column 610. The column 620 includes the output of the LPF 431. In this non-limiting example, the LPF 431 averages 10 bits and generates a rational number. For instance, the sum of the 10 first bits is 1 and dividing such sum by 10 results with number 0.1. The output of the LPF 431 is down sampled to meet the sampling rate of the ADC 434. In the example shown in FIG. 6, the down sampling ratio is 1 to 10, thus every tenth value of the LPF 431 is selected. The skip indicator is generated based on the value of the LPF by comparing the value to a threshold. In this example, for every LPF's value less than 0.3 and higher than 0.7 the skip indicator is set to '1', i.e., such a value will be included in the cross-correlation; otherwise, the indicator is set to zero. For example, the value rows 601 and 602 will be included in the accumulation, while value in rows 604 and 605 will not be part of the cross-correlation results. It should be noted that the ADC 434 also generates a rational number respective of the signal input by the receiver 453. Typically, the receiver 453 filters noises and high frequency components in the optical signal. It should be further noted that without departing from the scope of the invention, in the example shown in FIG. 6, the delay x is set to '0' merely for the sake of brevity of the description.

The various embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for performing in-band reflection analysis in a passive optical network (PON), comprising:
   an optical line terminal (OLT) that includes a transceiver configured to transmit continuous downstream data modulated on a first wavelength and receiving upstream burst data modulated on a second wavelength, wherein the OLT further includes a receiver for receiving signals reflected from the PON that are modulated on the first wavelength, wherein the continuous downstream data comprises user data and a test data pattern; and
   a reflection analysis unit for cross-correlating between a time-shifted version of the transmitted test data pattern and the reflected signals, wherein the test data pattern is time-shifted relatively for an optical location to be tested,
   wherein the reflection analysis unit comprises a data scanner configured to identify a data pattern that should not be cross-correlated by the reflection analysis unit based on whether a density of high frequency components in the transmitted downstream data is above a predefined threshold.

2. The system of claim 1, further comprising:
   an optical time-domain reflectometer (OTDR) processor for detecting optical faults in the tested optical location based on results of the reflection analysis.

3. The system of claim 1, wherein the reflection analysis unit further comprises:
   a low pass filter for filtering out high frequency components from the transmitted continuous downstream data;
   a delay line with a scaling constant for delaying the filtered data pattern in a time relative to the optical location to be tested, wherein the scaling constant is a predefined value;
   an analog-to-digital converter (ADC) coupled to the output of the receiver that converts the reflected optical signals to digital signals;
   a multiplier for multiplying the time delayed signal with a digital signal output by the ADC; and
   an accumulator for accumulating a current multiplication result with previous multiplication results.

4. The system of claim 3, wherein a number of accumulations is a function of a length of the test data pattern.

5. The system of claim 3, wherein the data scanner is configured to generate a skip indication indicating that the current multiplication result should not be accumulated.

6. The system of claim 5, wherein the skip indication is generated based on a value of an optical network unit (ONU) identifier in a downstream frame that is not associated with any ONU of the PON.

7. The system of claim 1, wherein the OLT is an OLT of the PON.

8. The system of claim 7, wherein the first wavelength and the second wavelength are the wavelengths defined in standard specifications of the PON.

9. The system of claim 8, wherein the PON is any one of: an Ethernet PON (EPON), a Gigabit (PON), and a 10-Gigabit (XG-PON).

10. The system of claim 2, wherein a detected optical fault includes at least one of: a damaged optical fiber, a bend in an optical fiber, a bad splice, a dirty connector, and a fiber cut.

11. A method for performing in-band reflection analysis in a passive optical network (PON), comprising:
establishing a dedicated receive path at an optical line terminal (OLT) of the PON to receive signals reflected from the PON, wherein the reflected signals are modulated on a downstream wavelength of the OLT;
transmitting continuous downstream data modulated on the downstream wavelength, wherein the downstream data includes user data and a test data pattern;
cross-correlating between a time-shifted version of the transmitted test data pattern and the reflected signals, wherein the test data pattern is time-shifted relative to an optical location to be tested; and
identifying a data pattern that should not be cross-correlated when a density of high frequency components in the transmitted downstream data is above a predefined threshold.

12. The method of claim 11, further comprising:
performing an optical time-domain reflectometer (OTDR) process for detecting optical faults in the tested optical location based on results of the cross-correlating.

13. The method of claim 11, further comprising:
filtering out high frequency components from the transmitted continuous downstream data;
time delaying the filtered downstream data in a time relative to the optical location to be tested;
scaling the delayed signal by a predefined scale constant;
converting the reflected signals received at the dedicated receive path to digital signals;
multiplying the time delayed and scaled signal with a converted digital signal; and
accumulating a current multiplication result with previous multiplication results.

14. The method of claim 13, wherein a number of accumulations is a function of a length of the test data pattern.

15. The method of claim 13, further comprising:
generating a skip indication indicating that the current multiplication result should not be accumulated.

16. The method of claim 15, wherein the skip indication is generated based on a value of an optical network unit (ONU) identifier in a downstream frame that is not associated with any ONU of the PON.

17. The method of claim 16, wherein the first wavelength is defined by standard specifications of the PON.

18. The method of claim 12, wherein a detected optical fault includes at least one of:
a damaged optical fiber, a bend in an optical fiber, a bad splice, a dirty connector, and a fiber cut.

19. An optical line terminal (OLT) operative in a passive optical network (PON) and configured to perform in-band reflection analysis, comprising:
a transceiver for transmitting continuous downstream data modulated on a first wavelength and receiving burst upstream data modulated on a second wavelength;
a receiver for receiving signals reflected from the PON and being modulated on the first wavelength;
a MAC module for generating the continuous downstream data, wherein the continuous downstream data includes user data and a test data pattern; and
a reflection analysis unit for cross-correlating between a time-shifted version of the transmitted test data pattern and the reflected signals, wherein the test data pattern is time-shifted relatively for an optical location to be tested,
wherein the reflection analysis unit comprises a data scanner configured to identify a data pattern that should not be cross-correlated by the reflection analysis unit based on whether a density of high frequency components in the transmitted downstream data is above a predefined threshold.

20. The OLT of claim 19, further comprising:
an optical time-domain reflectometer (OTDR) processor for detecting optical faults in the tested optical location based on results provided by the reflection analysis unit.

21. The OLT of claim 19, wherein the PON is any one of: an Ethernet PON (EPON), a Gigabit (PON), and a 10-Gigabit (XG-PON).

22. The system of claim 1, wherein the test data pattern is a continuous high rate data pattern that includes low rate components and is compliant with transmission specifications of the PON.

23. The method of claim 11, wherein the test data pattern is a continuous high rate data pattern that includes low rate components and is compliant with transmission specifications of the PON.

24. The OLT of claim 19, wherein the test data pattern is a continuous high rate data pattern that includes low rate components and is compliant with transmission specifications of the PON.

* * * * *